(12) United States Patent
Gogins

(10) Patent No.: US 6,875,249 B2
(45) Date of Patent: Apr. 5, 2005

(54) MOTOR VEHICLE FILTER STRUCTURE HAVING VISUAL INDICATOR OF USEFUL LIFE

(75) Inventor: Mark A. Gogins, Roseville, MN (US)

(73) Assignee: Donaldson Company, Inc., Minneapolis, MN (US)

(*) Notice: Subject to any disclaimer, the term of this patent is extended or adjusted under 35 U.S.C. 154(b) by 111 days.

(21) Appl. No.: 10/268,068

(22) Filed: Oct. 8, 2002

(65) Prior Publication Data

US 2004/0065195 A1 Apr. 8, 2004

(51) Int. Cl.$^7$ ............................................. B01D 46/10
(52) U.S. Cl. ...................... 55/385.3; 55/487; 55/498; 55/502; 55/510; 55/DIG. 34; 55/486; 96/414; 96/415; 96/416; 123/198 E
(58) Field of Search ................................. 55/385.3, 486, 55/487, 498, 502, 510, 500, 512, DIG. 34; 96/414, 415, 416; 123/198 E

(56) References Cited

U.S. PATENT DOCUMENTS

| | | | | |
|---|---|---|---|---|
| 4,779,456 A | * | 10/1988 | Cantoni | 96/414 |
| 4,880,448 A | * | 11/1989 | Scherrer | 55/486 |
| 5,762,669 A | * | 6/1998 | Kahlbaugh et al. | 55/498 |
| 5,762,670 A | * | 6/1998 | Kahlbaugh et al. | 55/486 |
| 5,792,227 A | * | 8/1998 | Kahlbaugh et al. | 55/486 |
| 5,800,587 A | * | 9/1998 | Kahlbaugh et al. | 55/486 |
| 6,001,151 A | * | 12/1999 | Elshout | 96/416 |
| 6,019,809 A | * | 2/2000 | Kahlbaugh et al. | 55/486 |
| 6,110,260 A | * | 8/2000 | Kubokawa | 96/414 |
| 6,508,868 B2 | * | 1/2003 | Pillion et al. | 96/416 |

* cited by examiner

Primary Examiner—Minh-Chau T. Pham
(74) Attorney, Agent, or Firm—Merchant & Gould P.C.

(57) ABSTRACT

Filter media and filter structure or media pack can be engineered to exhibit high initial efficiency and to surface load particulate removed from a gaseous stream. The filter technology protects engine operation from ingested particulate and accumulates the particulate as a surface loaded layer visible on the surface of the structure. The particulate accumulates as a surface loaded layer until it achieves a certain depth of particulate or gray scale characteristic or color depth indicative of the end of the useful life of the filter prompting a change of the filter structure. The filter structure is characterized by its ability to surface load particulate, avoid accumulation of particulate in the depth media and enhance the characteristics of the material through surface loading. Such technology is particularly useful in light duty vehicle maintenance technology.

59 Claims, 10 Drawing Sheets

*Engine Wear Rate and Filter Efficiency as a fraction of filter life obtained.*

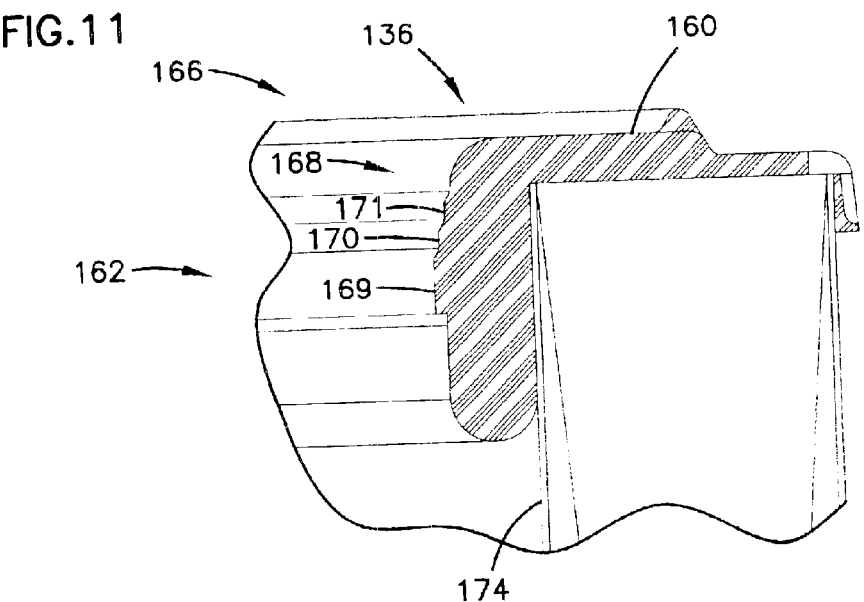
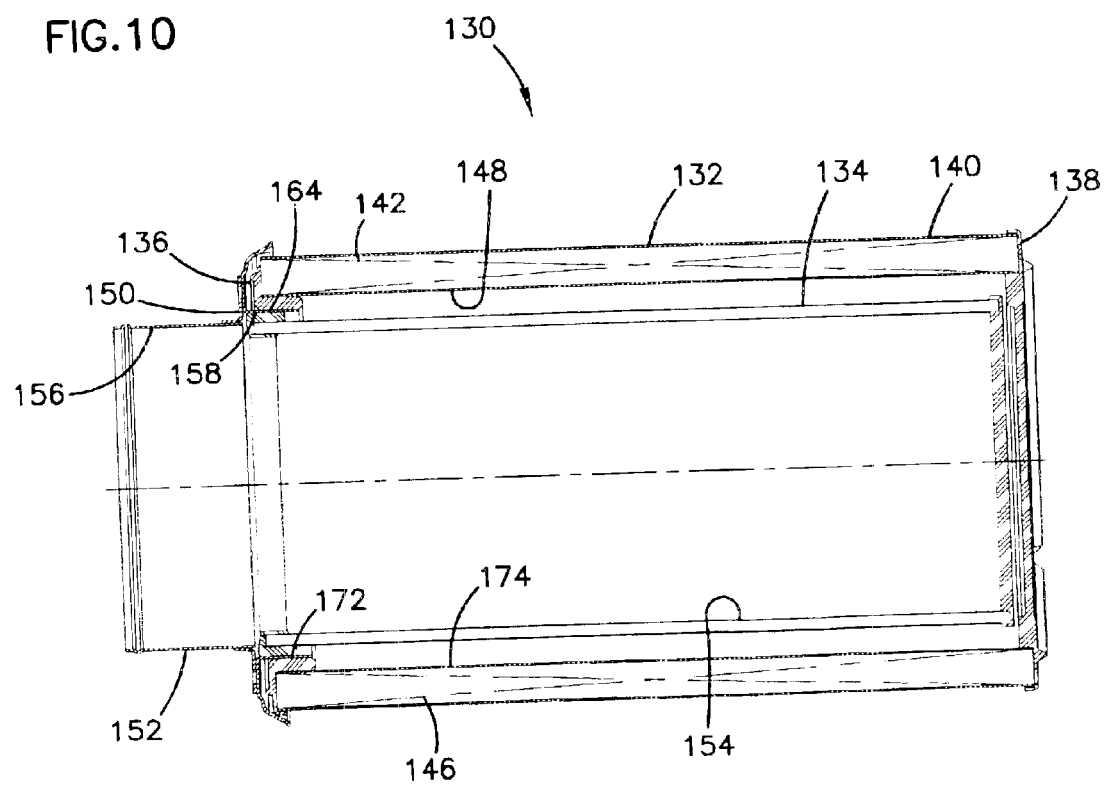

MOTOR VEHICLE FILTER STRUCTURE HAVING VISUAL INDICATOR OF USEFUL LIFE

FIELD OF THE INVENTION

This invention relates to replaceable filter elements used typically in motor vehicles including passenger automobiles and light trucks using a power source having an air intake. Power can be derived from an air breathing power plant such as either an internal combustion engine or fuel cell power plant. Such engines have an intake air flow rate of about 1 to $1 \cdot 10^5$ cfm, a horsepower output of about 2 to 500 horsepower and require filtration efficiency greater than 95% and over the lifetime of a filter unit to protect the engine from wear resulting from the ingestion of particulate materials. One aspect of the invention relates to a filter structure uniquely adapted to provide sufficient efficiency and a visual indication of useful lifetime. A second aspect of the invention relates to a method of maintaining a motor vehicle or vehicles with replaceable filter units. A last aspect of the invention relates to a retail business method of maintaining customer vehicles using a unique filter having a visual indication of lifetime.

BACKGROUND OF THE INVENTION

All filters should be replaced periodically. The replacement of filters in an efficient way optimizes machine operation and minimizes wear while minimizing filter costs. In many applications, air intake filters are changed based on a measurement of the pressure drop, filter particulate load, or other measurement of an unambiguous parameter of filter operation.

In consumer applications for light motor vehicles, the use of a measurement of a specific filtration parameter is simply not done due to cost and complexity. In light vehicle manufacture, the filter is simply replaced periodically, with or without a cursory inspection of the filter surface. One important parameter used to judge replacement relates to vehicle mileage. The filter can be simply replaced (e.g.) every 5,000–50,000 miles. This has little relationship to the likely accumulation of particulate on the filter surface because of the differences in environment, maintenance activity and other parameters. Such unscientific filter maintenance can be a problem.

Most automobile filters, when initially placed in service, have very low efficiency. The efficiency of the filter tends to substantially increase during filter life when the filter particulate participates in filtration efficiency. Filtration efficiency may not reach a sufficient level to provide protection to the engine for some weeks after installation. Accordingly, the replacement of the filter in an aggressive maintenance schedule can often result in substantial engine wear because of the low efficiency of clean filters. Filters that remain in the vehicle for extended periods of time can also cause problems related to substantially reduction of power output due to plugged filters, high ΔP and reduced flow rate.

Accordingly, a substantial need exists to obtain a filter that has an initial high efficiency, an improved indicator of useful lifetime, an improved method of maintaining motor vehicles and an improved business method for the retail maintenance of both passenger and fleet vehicles.

BRIEF DISCUSSION OF THE INVENTION

The invention relates to a filter pack device filtration system used in an air intake or air induction portion of a motor vehicle power source. The invention also relates to a maintenance method and to a business method to ensure improved inspection of filter cleanliness by visually inspecting the filter to obtain improved maintenance high filtration efficiency over the useful life of the filter. The filter is preferably made of a medium comprising high contrast material (when compared to particulate) that when covered by an accumulation of particulate, shows that the filter is at or near the end of the useful life by a visual inspection of depth of color or intensity of gray scale. In this way, the appearance of the filter can be used to indicate that time where the flow rate of air through the filter is reduced (or its pressure drop across the filter is increased) to a point such that the filter must be replaced for efficient operation and low cost filtration. In one embodiment the invention determines the useful life of the filter and the appropriate period in time in which replacing the filter media pack in a light vehicle. In typical light motor vehicles using air intake power plants, the air filter typically comprises a filter media having a surface loading filter material substrate, a gasketing material and a screen to give the filter some structural integrity.

For the purpose of this disclosure, the term motor vehicle indicates any wheeled conveyance obtaining motive power through a power plant having an air intake or air induction system. The air intake or air induction system typically comprises a housing or conduit typically including a location for the installation of an filter element in the form of the media pack positioned between an air intake proximate the exterior of the vehicle and the air intake in the engine or power plant. The term media pack indicates a structure including at least a bi-layer media held within a frame or cartridge structure and adapted to be placed in an air stream to remove particulate from air stream. Such media packs are engineered to insure that the intake air passes through the filter construction for particulate removal. The useful service life of a air filter media pack is the time period during which the media pack maintains greater than about 95% gravimetric efficiency (SAE J726—Air Cleaner Test) and a pressure drop of less than about 35 inches of water gauge. In other words the useful life of the media pack is that time period during which the media pack can successfully remove particulate from an intake air flow but not reduce the efficiency of the power plant by substantially impeding air flow. In no case will be power output of the power plant the reduced by more than 5% as a result of increased pressure drop (reduced air flow) across the media pack.

BRIEF DISCUSSION OF THE FIGURES

FIG. 1 displays typical efficiency of nanofiber compared to standard media relating to particle size.

Figure 4:
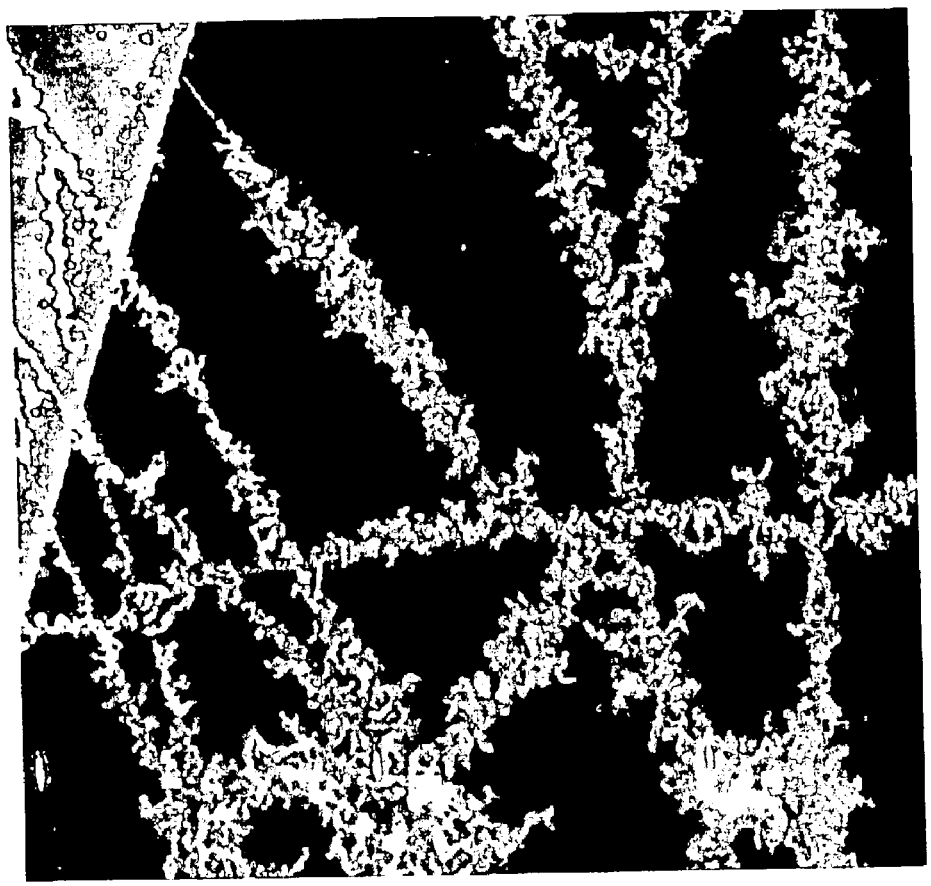

FIG. 4 is a scanning electron micrograph showing the collection of sodium chloride test crystals having a size from about 0.01 to about 0.5 micron collected on the sub half micron nanofiber layer in a filter media. The diameter of the large synthetic fiber in the upper left corner is about 15 microns and the nanofiber is substantially less than 1 micron.

This figure shows that very small particulate can be collected on nanofibers efficiently and can be visually inspected in the methods of the invention.

Figure 5:
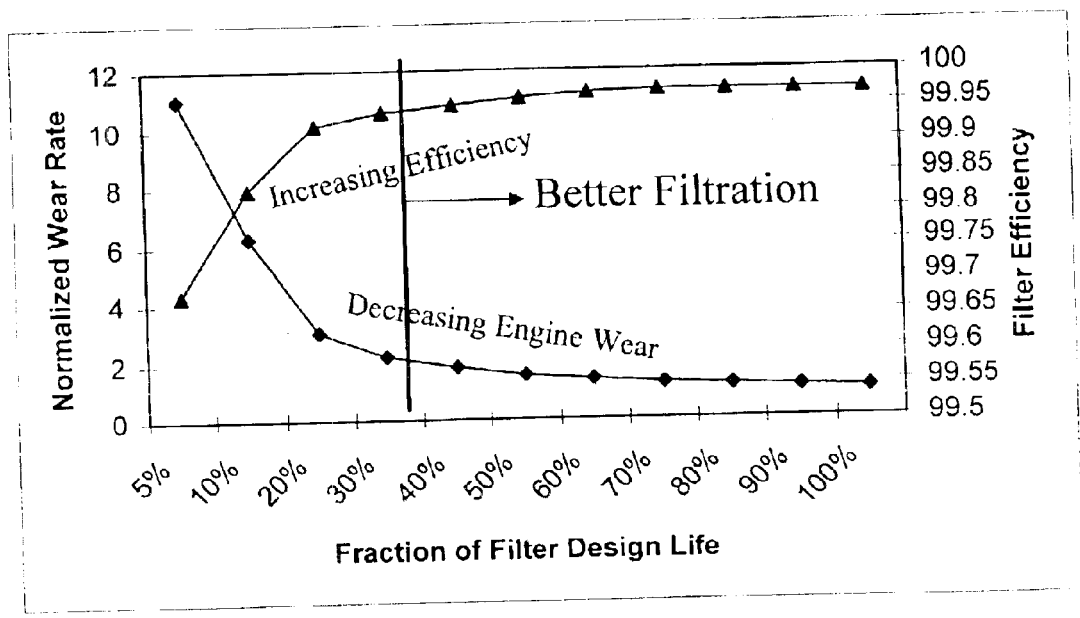

FIG. 5 displays a graph of engine wear rate and filter efficiency as a fraction of filter life.

Figure 6:
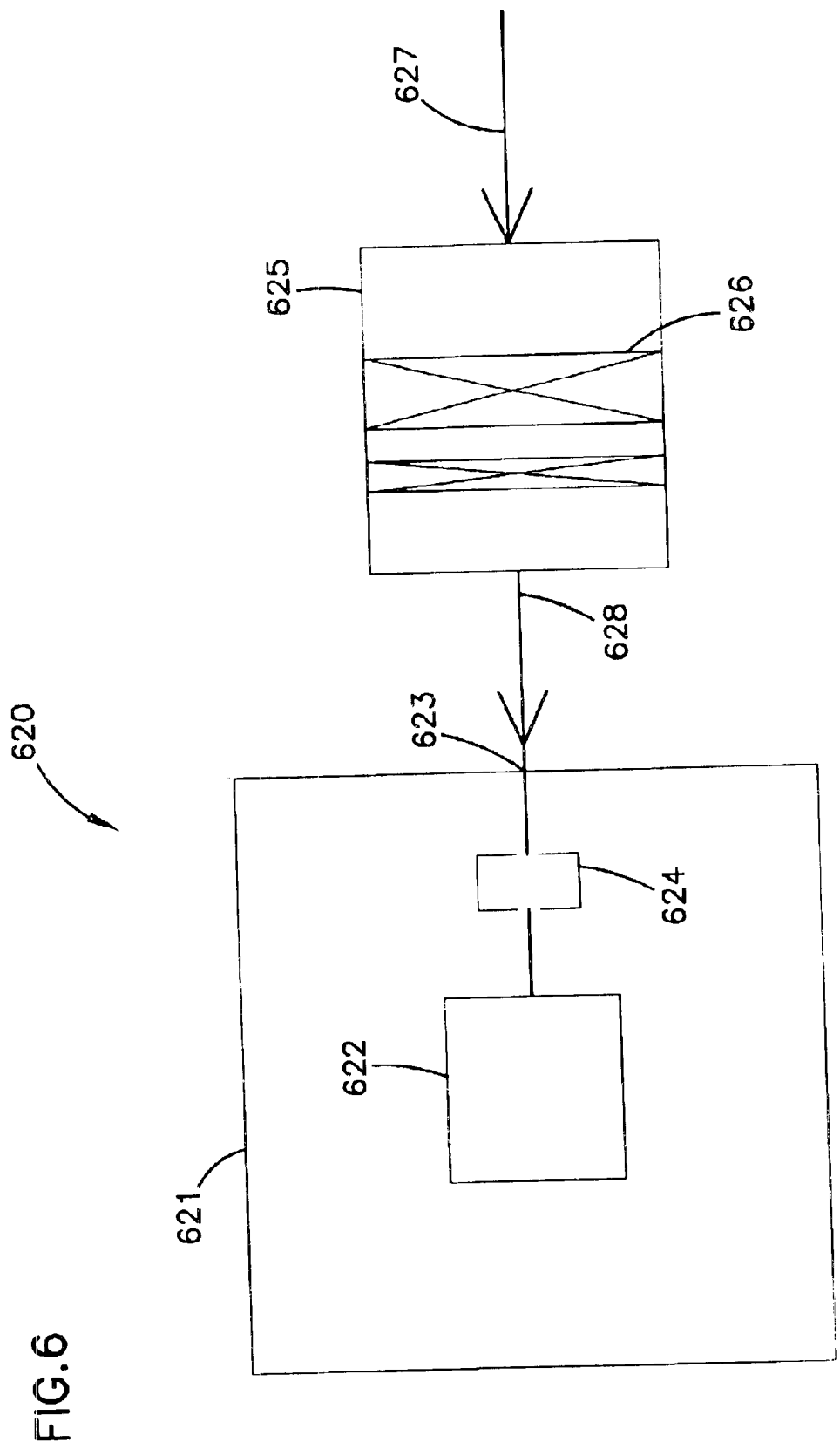

FIG. 6 is a schematic depiction of an engine system with an air intake filtration system utilizing filters constructed according to principles of this disclosure.

Figure 7:
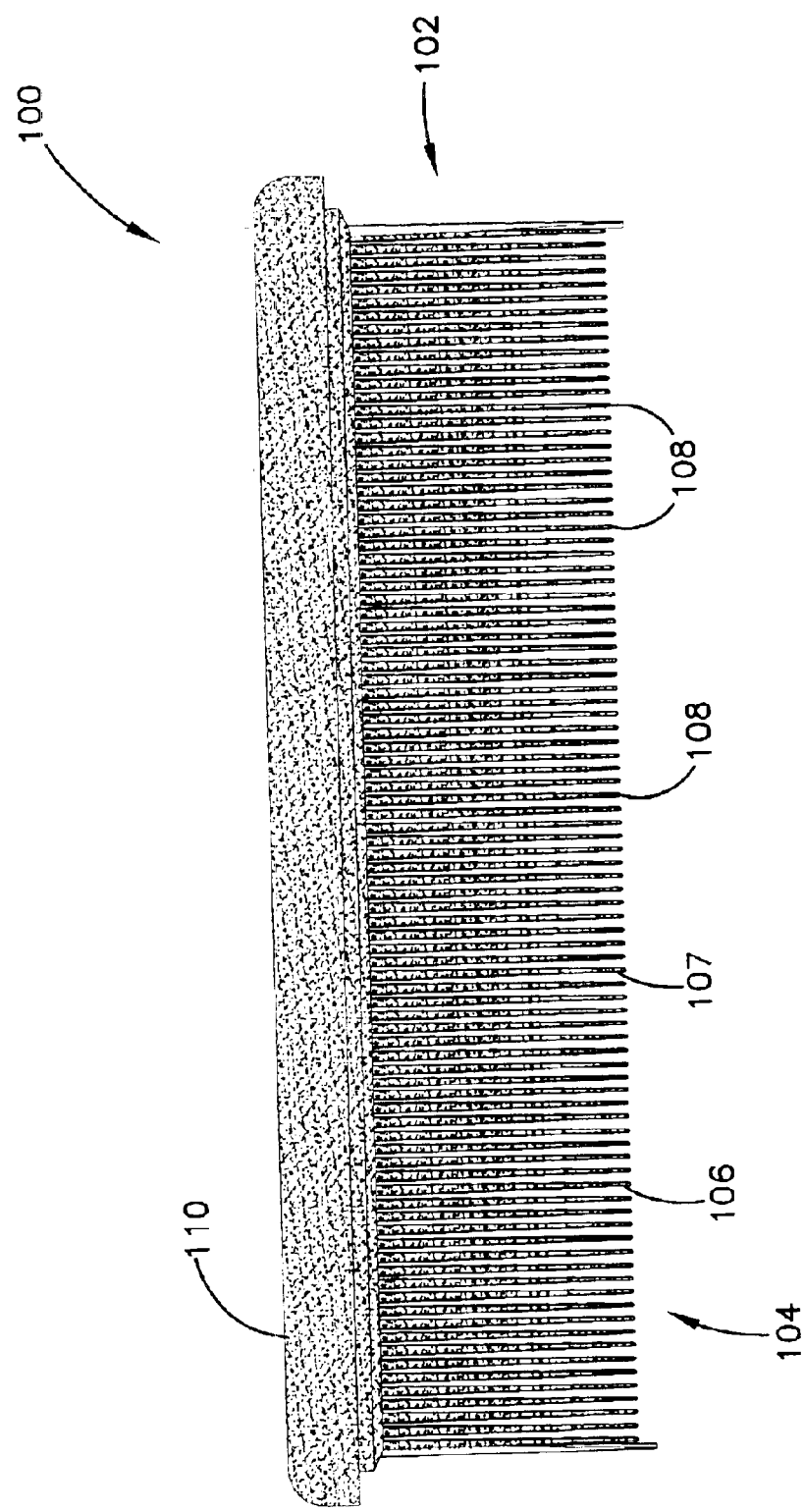

FIG. 7 is a side elevational view of one embodiment of a filter element utilizing filter media constructed according to principles of this disclosure.

Figure 8:
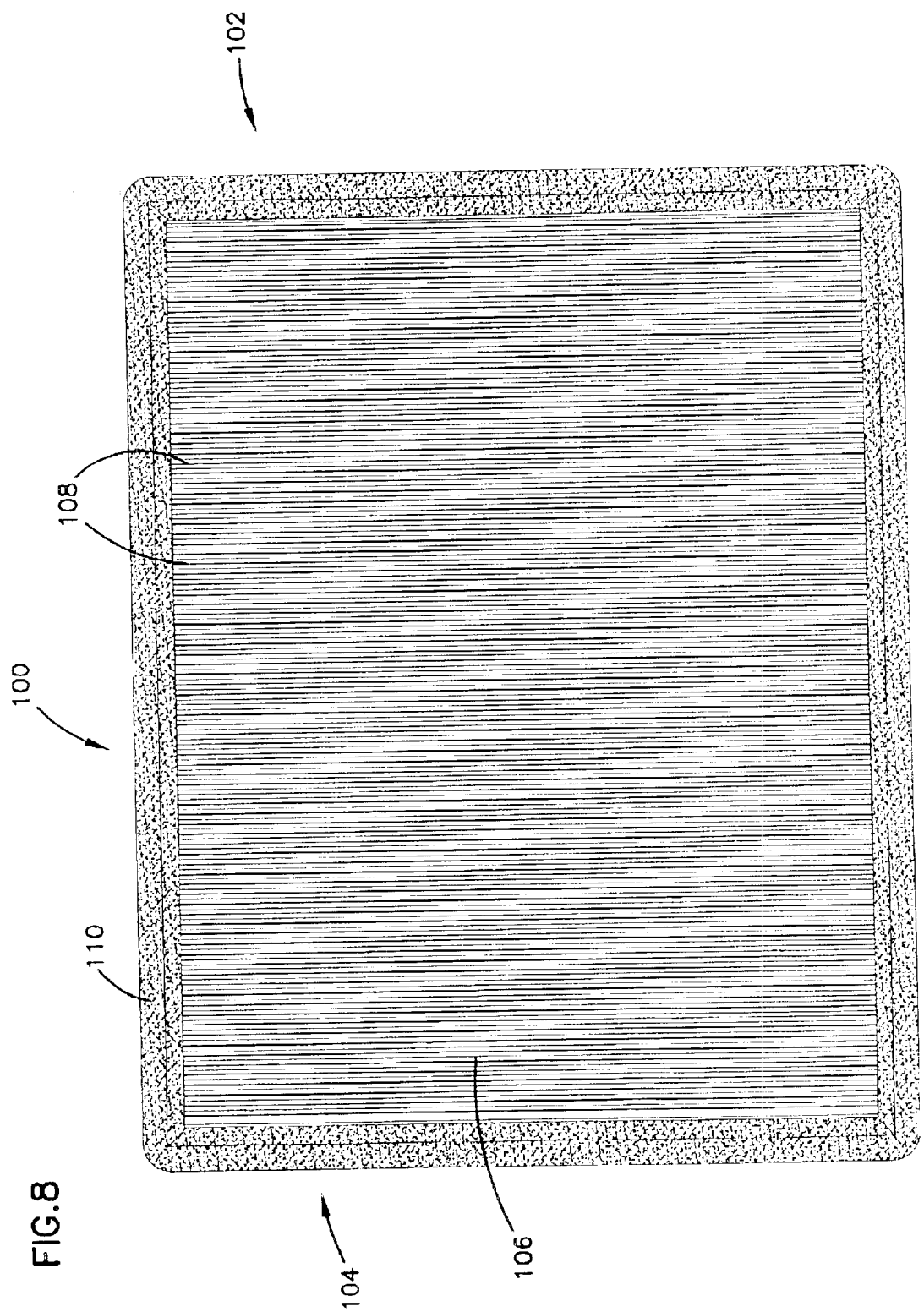

FIG. 8 is a top plan view of the filter element depicted in FIG. 7.

Figure 9:
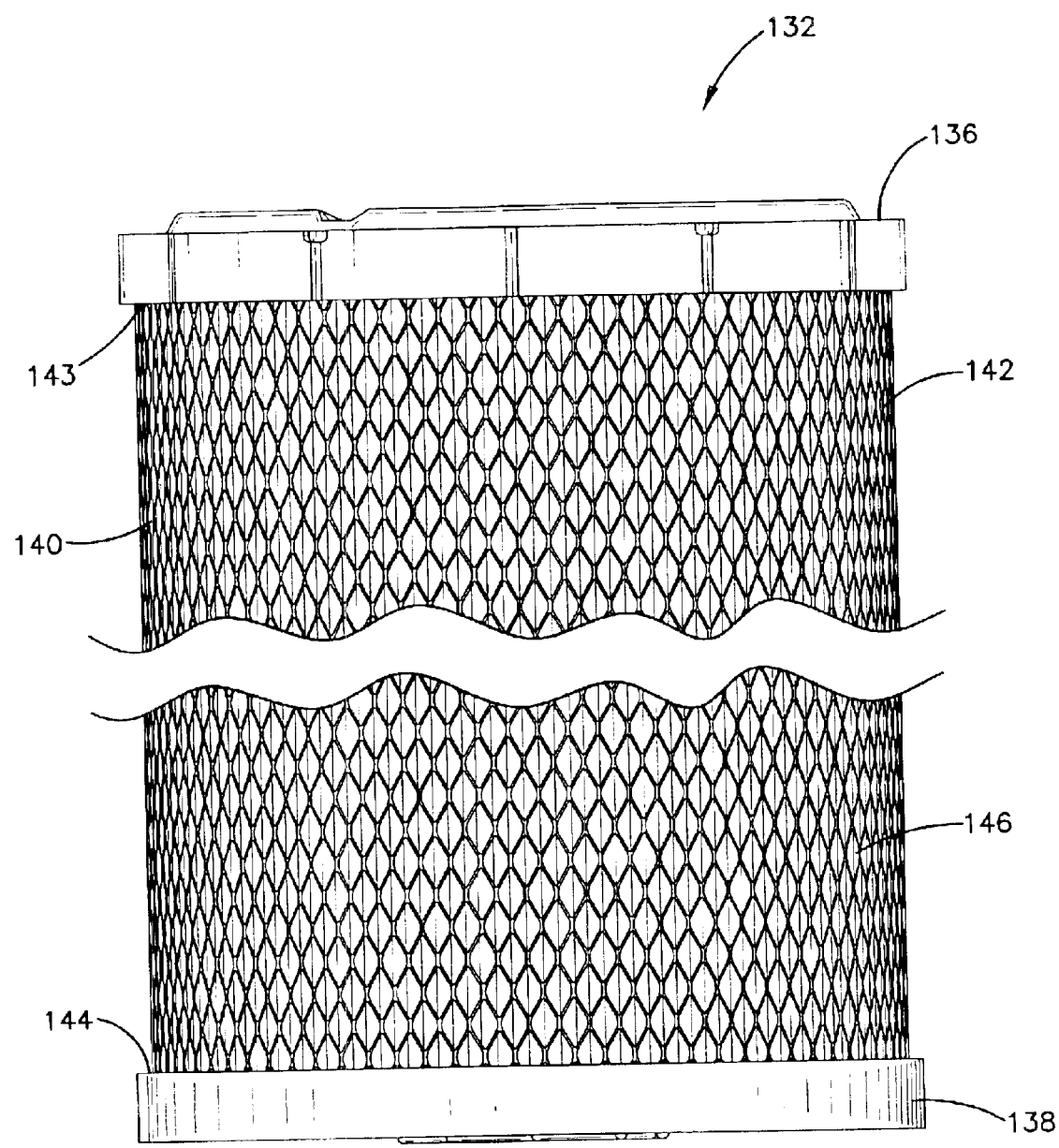
Figure 2:
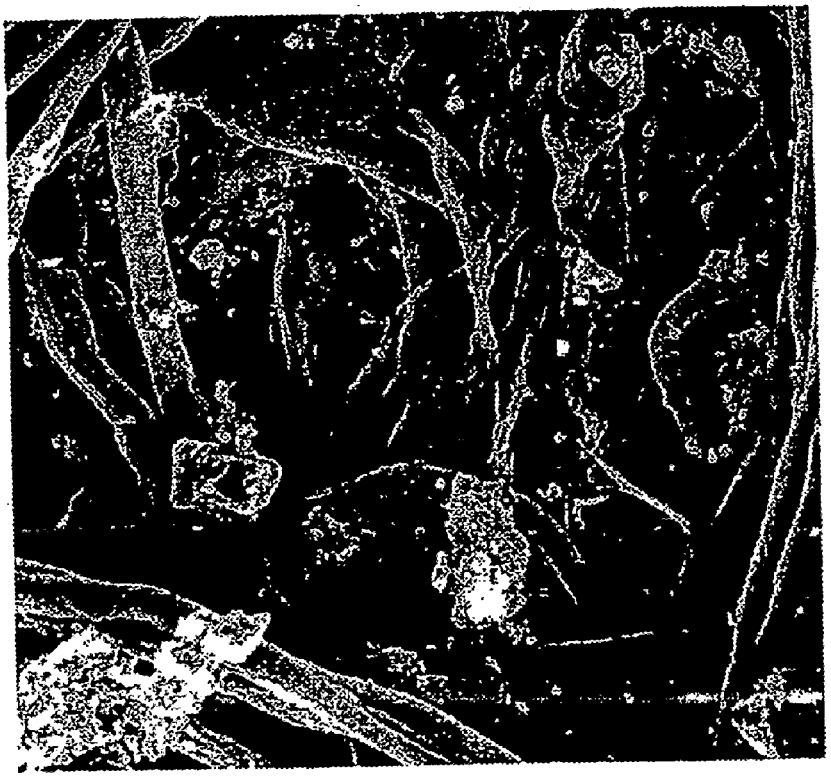
Figure 3:
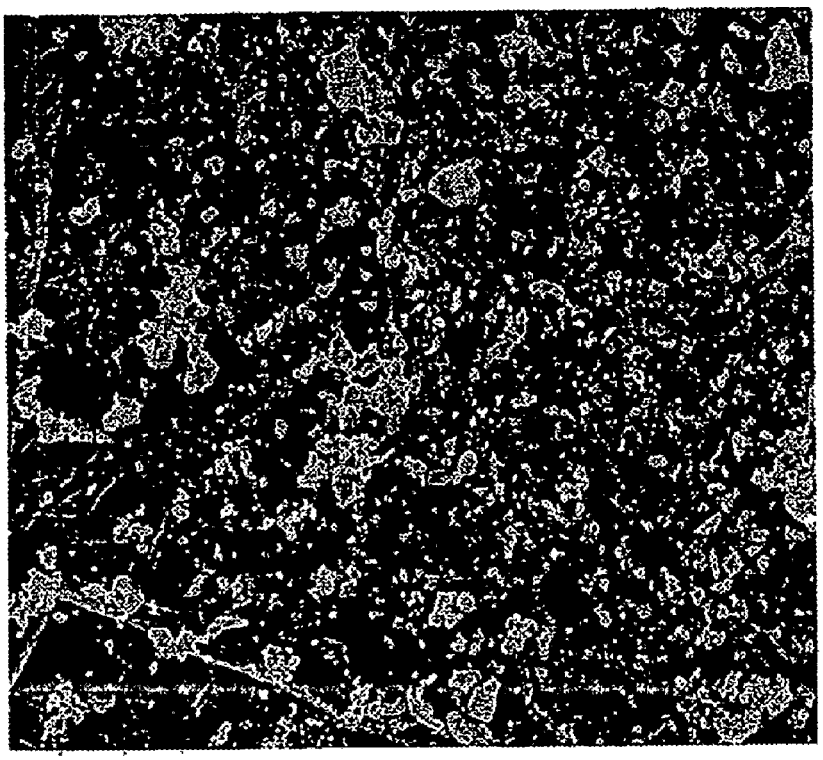
Figure 4:
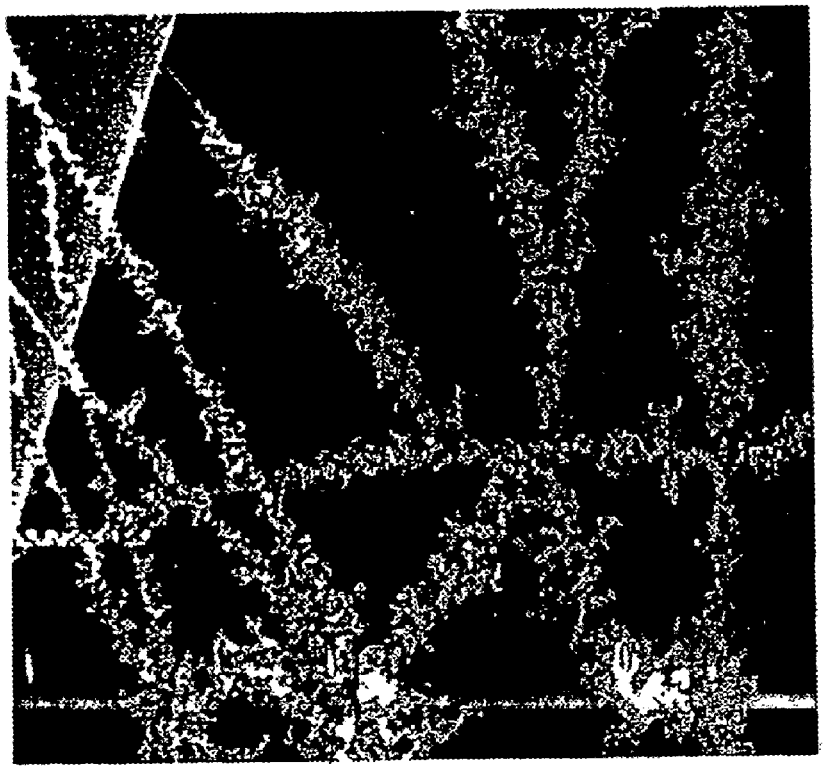

FIG. 9 is a side elevational view, fragmented, depicting another embodiment of a filter element utilizing filter media constructed according to principles of this disclosure.

FIG. 10 is a schematic, cross-sectional view of the filter element depicted in FIG. 9, and installed on an air flow tube, and having a safety filter element installed therein.

FIG. 11 is a schematic, cross-sectional view of a portion of the end cap of the filter element depicted in FIGS. 9 and 10 and showing a radially directed sealing member.

DETAILED DESCRIPTION OF THE INVENTION

The invention relates to a filter pack device filtration system used in an air intake or air induction portion of a motor vehicle power source. The invention also relates to a maintenance method and to a business method to ensure improved inspection of filter cleanliness by visually inspecting the filter to obtain improved maintenance high filtration efficiency over the useful life of the filter. The filter is preferable made of a medium comprising high contrast material (when compared to particulate) that when covered by an accumulation of particulate, shows that the filter is at or near the end of the useful life by a visual inspection of depth of color or intensity of gray scale. In this way, the appearance of the filter can be used to indicate that time where the flow rate of air through the filter is reduced (or its pressure drop across the filter is increased) to a point such that the filter must be replaced for efficient operation and low cost filtration. The filter media is typically white in color to provide a maximum contrast with dark-colored, brown, gray, or black particulate. A black filter media could also be used when a light, white, off-white or tan particulate is common, in an arid area such as a desert climate. The medium typically comprises a high efficiency nanofiber or microfiber layer on a low efficiency, high permeable media layer.

Microfiber or nanofiber containing filter media has been successfully used in a variety of filtration applications ranging from engine air cleaners to cabin filters for mining vehicles to self-cleaning filter systems for industrial applications and turbine vehicles. Due to the sub-half-micron fiber diameter of nanofibers and the thin nanoweb layer possible, significant boosts in filter efficiency are possible with minimal pressure drop increases.

The filter media includes at least a micro- or nanofiber web layer in combination with a substrate material in a mechanically stable filter structure. These layers have similar or identical (contrasting to the particulate) colors and together provide excellent filtering, high particle capture, efficiency at minimum flow restriction when a air stream passes through the filter media. The substrate can be positioned in the fluid stream downstream of the microfiber or nanofiber layer. The microfiber or nanofiber layer positioned on the substrate is engineered to be a surface loading material. Surface loading indicates that the substantial proportion of the filtered particulate remains on the surface of the nanofiber, provides a visual indicator of particulate accumulation amount and when the amount of particulate accumulates to a certain depth of color or gray scale intensity, the filter can be replaced to ensure substantial filtration efficiency and substantial engine efficiency. Such filtration processes require the mechanical strength, chemical and physical stability of the microfiber and the substrate materials. The filter media can be exposed to a broad range of temperature conditions, humidity, mechanical vibration and shock and both reactive and non-reactive, abrasive or non-abrasive particulates entrained in the fluid flow. Such filters should be removed and replaced at service intervals that optimizes operation and minimizes filter costs. The filter media pack and methods of this invention provide a useful filter and method providing visual indication of the replacement.

Such media are often manufactured by spinning fine fiber and then forming a layer, a web or an interlocking web of microfiber on a porous media layer or substrate. In the spinning process the fiber can form physical bonds between fibers to interlock or integrate the layer and to secure the fiber mat into a layer. Such a material can then be bonded to a substrate, and fabricated into the desired filter format such as cartridges, flat disks, canisters, panels, bags and pouches. Within such structures, the media can be substantially pleated, rolled or otherwise positioned on support structures. The filter arrangements described herein can be utilized in a wide variety of applications including: equipment enclosures, vehicle cabin ventilation, cabin air filters, on-road and off-road engines; and, industrial equipment, such as compressors and other related applications.

Particle filtration occurs via multiple collection mechanisms including sieving, direct interception, inertial impaction, diffusion and electrostatic collection. For practical purposes, sieving is not an important mechanism in most air filtration applications. Commercially available nanofibers are electrically neutral. As a result, the remaining mechanisms of importance in mechanical filtration are direct interception, inertial impaction and diffusion. The mathematical description of filter media is complex. However, reasonable approximations of media performance have been made using single fiber filtration theory.

The single fiber efficiency for direct interception $E_R = (D_P/D_F)^2/Ku$

Where $D_P$ is the particle diameter, $D_F$ is the fiber diameter and Ku is the Kuwabara constant. As can be seen, filtration efficiency due to direct interception $E_R$ is inversely proportional to the square of the fiber diameter.

The single fiber efficiency for inertial impaction $E_I \propto St/(2Ku^2)$

Where St (Stokes Number)=$S_D/D_F$ and where $S_D$ is the Stopping Distance. As can be seen, filtration efficiency due to inertial impaction $E_I$ is inversely proportional to the fiber diameter.

The single fiber efficiency for diffusion $E_D$ is $E_D = 2.7/(Pe)^{2/3}$

Where Pe is the Peclet number and is defined as $Pe = D_F U/D$ and where U is velocity and D is the coefficient of diffusion. As with the other filtration mechanisms, decreasing fiber diameter increases filtration efficiency due to diffusion.

Figure 1:
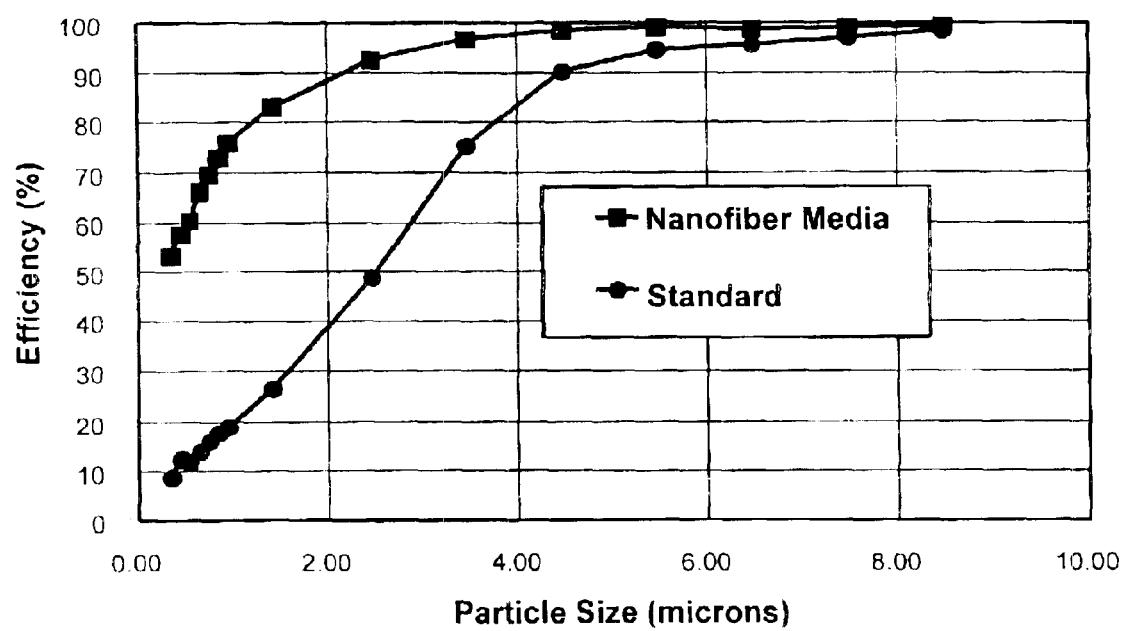

These effects of increasing filtration efficiency can be observed experimentally by measuring filter efficiency as a function of particle size (FIG. 1).

Figure 2:
FIG. 2 is a scanning electron micrograph showing conventional dust filter material in an engine air cleaner filter loaded with ISO fine dust. In such filter structures, the dust is depth loaded within the structure of the engineer cleaner material and typically does not appear on the surface of the filter media.

FIG. 2 is a scanning electron micrograph showing conventional dust filter material in an engine air cleaner filter loaded with ISO fine dust. In such filter structures, the dust is depth loaded within the structure of the engineer cleaner material and typically does not appear on the surface of the filter media.

Figure 3:
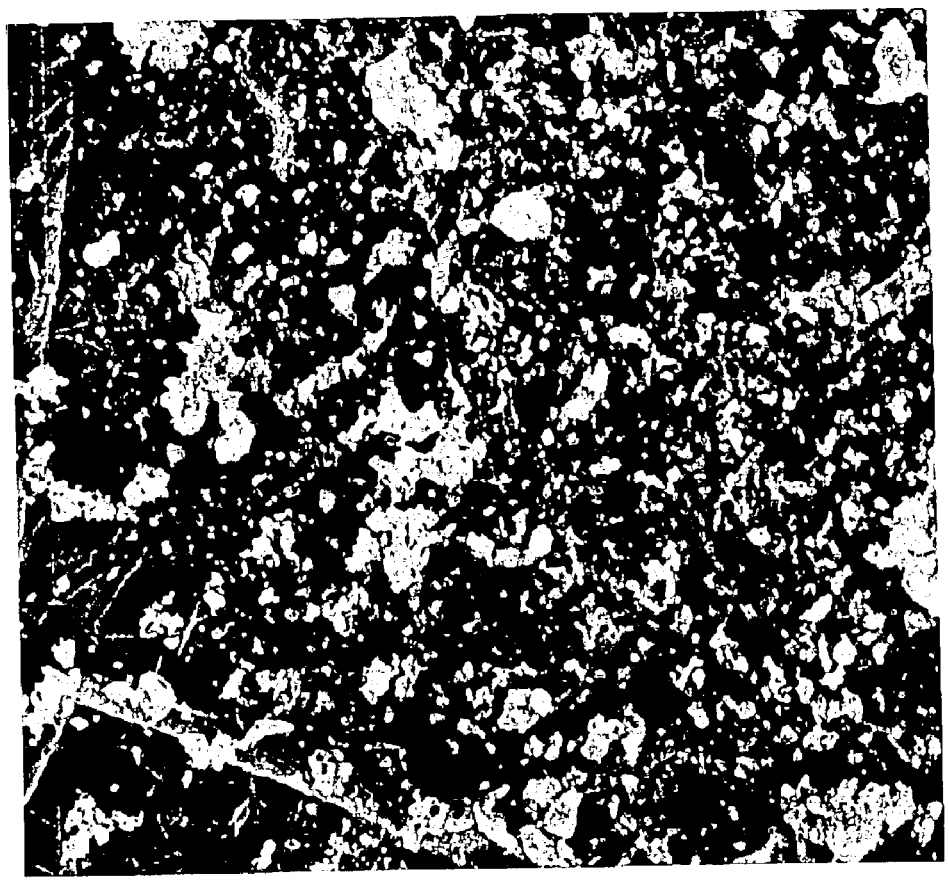
FIG. 3 is a scanning electron micrograph of a nanofiber filter media for engine air cleaner applications loaded with ISO fine dust. The small particles are retained on the surface of the nanofiber layer and can be visually inspected.

FIG. 3 is a scanning electron micrograph of a nanofiber filter media for engine air cleaner applications loaded with ISO fine dust. The small particles are retained on the surface of the nanofiber layer and can be visually inspected.

FIG. 4 is a scanning electron micrograph showing the collection of sodium chloride test crystals having a size from about 0.01 to about 0.5 micron collected on the sub half micron nanofiber layer in a filter media. The diameter of the large synthetic fiber in the upper left corner is about 15 microns and the nanofiber is substantially less than 1 micron. This figure shows that very small particulate can be collected on nanofibers efficiently and can be visually inspected in the methods of the invention.

For most engine air filters, the function of the filter and the corresponding engine wear are based largely on dust cake filtration. The formation of a dust cake on the filter media changes many important factors in the function of a filter media, including filtration efficiency and pore size distribution. Engine wear rate has been shown to be significant during the early portion of an air filter's design life (FIG. 5). While vehicle manufacturers are specifying longer life air cleaners and longer maintenance intervals, the actual service interval for air filters varies widely depending on the sophistication of the vehicle end-user and the maintenance staff. The most sophisticated end-users are large fleet operators with several thousand vehicles. Air cleaner maintenance is typically performed based on filter restriction using a restriction indicator on the vehicle. Maintenance decisions are largely made based on economic factors, and trained personnel provide oversight on maintenance intervals and filter selection. The decisions are based on a complex interaction of factors, including filter design and efficiency, filter maintenance interval, filter and service cost, and engine wear rate.

The use of nanofiber filter media has provided extended service life in a variety of on-road and off-road applications. In mining applications, nanofiber filters have provided 4 times the filter life. In on-road applications, nanofiber filters are available with twice the filter life of conventional cellulose filters. The life increases observed with nanofiber filters are more pronounced in applications with sub-micron contaminants from engine exhaust and industrial processes.

Consumers must also make maintenance decisions about the air filters in their cars. This user group is relatively unsophisticated in their knowledge of filter maintenance and function. Air filters are perhaps the most easily serviced but least understood parts on a vehicle. Other common replacement parts on a vehicle such as tires, wiper blades, oil and oil filters work best when new. However, this is not the case with conventional air filters. Since most air filters rely on the formation of a dust cake to improve the performance of a filter media, over-servicing can lead to dire consequences from inadequate engine protection.

Air filter over-servicing is common for light vehicles. Light vehicles are generally not equipped with filter restriction indicators. Air filters are often inspected by maintenance personnel during oil changes. In spite of the typical manufacturer's recommendation of at least a 30,000-mile change interval, it is common for dealers, service stations and quick lube businesses to recommend more frequent air filter changes. Given the frequency of oil changes and air filter replacements at quick lubes, it is expected many light vehicle air filters are changed much more frequently than manufacturers recommend.

While this over-servicing phenomenon is frustrating to those who understand filter media performance, the filter industry has not sufficiently educated customers how air filters function. Not surprisingly, filter manufacturers, distributors, dealers, service stations, and quick lubes have economic incentives to change and sell more air filters. It is also understandable that consumers believe air filters work best when they are new (like other parts) and have a clean appearance.

In spite of the best intentions of automotive mechanics and consumers, typical automotive air filters are notably inefficient at capturing particles less than 5 microns in size. Several studies have shown that particles between 1–5 microns cause engine wear, which will lead to increased engine emissions and shorter engine life. Because many car engine air filters are over-serviced, a typical automotive filter may operate for most of its life without the protective benefits of a well-developed protective dust cake. As the filter becomes dirty by visual appearance (and the dust cake finally starts working) the filter is often exchanged. One unique feature of the filters of the invention having fine fiber is the initial high and significant efficiency. The initial efficiency can be at least 20%, 30%, 40% or higher compared to the generally low efficiency of new filters. The dust cake build up increases efficiency and pressure drop until the end of the useful life at or near the end of useful life the efficiency can exceed 99% or more.

The use of nanofiber filter media in engine air filters can solve the problems of over-servicing and can provide the customer a filter which works well (i.e., is satisfactorily efficient at removing particles greater than 1 micron) when new. The nanofiber layer acts to improve initial efficiency as a surrogate for a dust cake. The low additional pressure drop of the nanofiber layer does little to impair engine power or fuel economy. A nanofiber filter works as a customer intuitively expects: it provides full protection with maximum engine performance when new. A filter with nanofiber media also works in concert with the economic incentives of filter suppliers and maintenance providers to service air filters frequently (i.e. over-servicing does not lead to dire consequences).

The invention provides an improved visually indicating filter using a nanofiber or microfiber on a substrate material. This polymer has improved physical and chemical stability. The polymer fine fiber, with a diameter of 200 nanometers to 10 microns, (microfiber and nanofiber) can be fashioned into useful product formats (e.g., when formed onto a substrate). Nanofiber is a fiber with diameter less than 200 nanometer or 0.2 micron. Microfiber is a fiber with diameter larger than 0.2 micron, but not larger than 10 microns. This fine fiber can be made in the form of an improved multilayer microfiltration media structure. The fine fiber layers of the invention comprise a random distribution of fine fibers which can be bonded to form an interlocking net.

Filtration performance is obtained largely as a result of the fine fiber barrier to the passage of particulate. Structural properties of stiffness, strength, pleatability are provided by the substrate to which the fine fiber adhered. The fine fiber interlocking networks have as important characteristics, fine fibers in the form of microfibers or nanofibers and relatively small openings, orifices or spaces between the fibers. Such spaces typically range, between fibers, of about 0.01 to about 25 microns or often about 0.1 to about 10 microns.

The filter products comprise a fine fiber layer formed on a substrate. Fibers from synthetic, natural sources (e.g., polyester and cellulose layers) are thin, appropriate substrate choices. The fine fiber adds less than a micron in thickness to the overall fine fiber plus substrate filter media. In service, the filters can stop incident particulate from passing through the fine fiber layer and can attain substantial surface loadings of trapped particles. The particles comprising dust or other incident particulates rapidly form a dust cake on the fine fiber surface and maintains high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall-structure of the filter materials provides an overall thinner media allowing improved media area per unit volume, reduced velocity through the media, improved media efficiency and reduced flow restrictions.

The fine fiber can be made of a polymer material or a polymer plus additive. One preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of about 0.01 to 5 microns. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). A number average molecular weight ($M_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

A particularly preferred material of the invention comprises a microfiber material having a dimension of about 0.001 to 10 microns. A preferred fiber size range between 0.05 to 0.5 micron. Depending on end use and pulse cleaner or cleaning options, the fiber may be selected from 0.01 to 2 microns fiber, from 0.005 to 5 microns fiber or from 0.1 to 10 microns fiber. Such fibers with the preferred size provide excellent filter activity. The highly preferred polymer systems of the invention have adhering characteristic such that when contacted with a cellulosic substrate adheres to the substrate with sufficient strength such that it is securely bonded to the substrate and can resist the delaminating effects of mechanical stresses. In such a mode, the polymer material must stay attached to the substrate while undergoing vibration and stress from vehicle movement, engine vibration, rough terrain and flow pulsations. Such adhesion can arise from solvent effects of fiber formation as the fiber is contacted with the substrate or the post treatment of the fiber on the substrate with heat or pressure. However, polymer characteristics appear to play an important role in determining adhesion, such as specific chemical interactions like hydrogen bonding, contact between polymer and substrate occurring above or below Tg, and the polymer formulation including additives. Polymers plasticized with solvent or steam at the time of adhesion can have increased adhesion.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both.

The fine fibers that comprise the micro- or nanofiber containing layer of the invention can have a diameter of about 0.001 to 10 microns, preferably 0.05 to 0.5 micron. The thickness of the typical fine fiber filtration layer ranges from about 1 to 100 times the fiber diameter with a basis weight ranging from about 0.01 to 240 micrograms-cm$^{-2}$.

Polymeric materials have been fabricated in non-woven and woven fabrics, fibers and microfibers. The polymeric material provides the physical properties required for product stability. These materials should not change significantly in dimension, suffer reduced molecular weight, become less flexible or subject to stress cracking or physically deteriorate in the presence of sunlight, humidity, high temperatures or other negative environmental effects. The invention relates to an improved polymeric material that can maintain physical properties in the face of incident electromagnetic radiation such as environmental light, heat, humidity and other physical challenges.

Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials.

The filter products comprise a fine fiber layer formed on a substrate. Preferred substrates are low efficiency, high permeability substrate materials. The Frazier permeability of the substrates can be greater than 15, more preferably greater than 25, most preferably greater than 50. The substrates have efficiency less than about 40%, preferably les than 30%, most preferably less than 15%. Fibers from synthetic, natural sources (e.g., polyester and cellulose layers) are thin, appropriate substrate choices. The fine fiber adds less than a micron in thickness to the overall fine fiber plus substrate filter media. In service, the filters can stop incident particulate from passing through the fine fiber layer and can attain substantial surface loadings of trapped particles. The particles comprising dust or other incident particulates rapidly form a dust cake on the fine fiber surface and maintains high initial and overall efficiency of particulate removal. Even with relatively fine contaminants having a particle size of about 0.01 to about 1 micron, the filter media comprising the fine fiber has a very high dust capacity.

Filter Media Examples of useful Permeability and Efficiency

| Filter Media Examples of useful Permeability and Efficiency | | | | |
|---|---|---|---|---|
| Substrate | Substrate perm (Frazier) | Substrate Basis wt (lbs/ 3000 sq ft) | Substrate Thickness (in) | Substrate Eff (LEFS) |
| Single fine fiber layer on single substrate (flow either direction through media | (+/−10% | (+/−10%) | (+/−25%) | (+/−5%) |
| Cellulose air filter media | 58 | 67 | 0.012 | 11% |
| Cellulose air filter media | 58 | 67 | 0.012 | 11% |
| Cellulose air filter media | 22 | 52 | 0.010 | 17% |
| Cellulose/synthetic blend with moisture resistant resin | 14 | 70 | 0.012 | 30% |
| Flame retardant cellulose air filter media | 17 | 77 | 0.012 | 31% |
| Flame retardant cellulose air filter media | 17 | 77 | 0.012 | 31% |
| Spunbond Remay (polyester) | 1200 | 15 | 0.007 | 5% |
| Synthetic/cellulose air filter media | 260 | 76 | 0.015 | 6% |
| Synthetic (Lutrador-polyester) | 300 | 25 | 0.008 | 3% |

Media has been used flat, corrugated, pleated, corrugated and pleated, in flatsheets, pleated flat panels, pleated round filters, and Zee filters.

Herein, the term "air cleaner" will be used in reference to a system which functions to remove particulate material from an air flow stream. The term "air filter" references a system in which removal is conducted by passage of the air, carrying particulate therein, through filter media pack. The term "filter media pack" refers to a material or collection of material through which the air passes, with a concomitant deposition of the particles in or on the media. The term "surface loading media" or "barrier media" refers to a system in which as the air passes through the media, the particulate material is primarily deposited on the surface of the media, forming a filter cake, as opposed to into or through the depth of the media.

Herein the term "filter element" is generally meant to refer to a portion of the air cleaner which includes the filter media therein. In general, a filter element will be designed as a removable and replaceable, i.e. serviceable, portion of the air cleaner. That is, the filter media will be carried by the filter element and be separable from the remainder portion of the air cleaner so that periodically the air cleaner can be rejuvenated by removing a loaded or partially loaded filter element and replacing it with a new, or cleaned, filter element. Preferably, the air cleaner is designed so that the removal and replacement can be conducted by hand. The fine fiber layers formed on the substrate in the filters of the invention should be substantially uniform in both filtering performance and fiber location. By substantial uniformity, we mean that the fiber has sufficient coverage of the substrate to have at least some measurable filtration efficiency throughout the covered substrate. Adequate filtration can occur with wide variation in fiber add-on. Accordingly, the fine fiber layers can vary in fiber coverage, basis weight, layer thickness or other measurement of fiber add-on and still remain well within the bounds of the invention. Even a relatively small add-on of fine fiber can add efficiency to the overall filter structure.

The uniform fine fiber layer formed on the substrate, in a flat or pleated form provides a surface ideal for the accumulation of particulate. The fine fiber and the media are selected to be of a standard light colored appearance that provides a quality comparative background for the accumulation of colored or dark gray scale dust. The use of fine fiber and a light colored or white substrate provides an excellent place for measuring visually the accumulation of sufficient amount of fine particulate such that the viewer recognizes that the accumulation of such particulate is either sufficient to indicate the end of the useful lifetime of the filter or to indicate that the filter does not, as yet, require replacement. The depth of color or depth of gray scale can be measured by the following comparison procedure, typically by a service technician visually inspecting the filter surface. Such an inspection requires a comparative standard. For urban environments, worldwide, a white media and a black or dark gray particulate are common. In urban environments, a standard color can be easily established by measuring the efficiency and pressure drop of a typical filter at the end of its useful life and then establishing the color as the standard color.

Such a standard color could be used as follows:

1. Put a standard gray-scale sticker on the filter frame for comparison to a dust cake.
2. Put a standard gray-scale sticker on a new filter box to use as comparison.
3. Make the filter frame to be the standard gray-scale of the dirty filter, inspect for matching the dust cake to the frame.
4. Print something on the substrate material to be the standard gray-scale comparison, and change the filter when the printing can no longer be read
5. Printing, coloring or dying the filter media to make a light and dark area, areas, or pattern, the dark area or pattern to be the standard gray-scale, the filter to be changed when light and dark pattern is no longer discernable.

6. Make a section of the filter media impermeable (with a piece of tape or a sticker, impregnation, etc) such that no air flows through it. When filter is dirty, a person could see a difference between the impermeable section (no air went through, so no dirt, so the media will still be clean) and the rest of the media pack Alternative dark contrasting colors of fine fiber and substrate could be chosen to achieve good contrast when the particulate is lighter colored, like desert sand or alkaline, borax or salt particulate.

Such a dark contrasting color could be used with a contrasting light particulate as follows:

1. Put a standard lightly colored sticker on the filter frame for comparison to a dust cake.
2. Put a standard lightly colored sticker on a new filter box to use as comparison.
3. Make the filter frame to be the standard lightly colored dirty filter, inspect for matching the dust cake to the frame.
4. Print something on the substrate material to be the standard lightly colored comparison, and change the filter when the printing can no longer be read
5. Printing, coloring or dying the filter media to make a light and dark area, areas, or pattern, the light part of the area or pattern to be the standard lightly colored, the filter to be changed when light and dark pattern is no longer discernable.
6. Make a section of the filter media impermeable (with a piece of tape or a sticker, impregnation, etc) such that no air flows through it. When filter is dirty, a person could see a difference between the impermeable section (no air went through, so no dirt, so the media will still be clean) and the rest of the media pack The useful lifetime of the filter structure is determined by comparing the color of the dust cake to the background media color and the color standard used in our on the filter. As discussed above the filter can contain a colored sticker, colored frame, comparative media standard or other comparison color placed in the filter unit. The dark colored or gray scale filter cake compared to the weight media or the light colored or white filter cake compared to the dark media can be used with a standardized or calibrated comparison. The colored sticker, colored frame, colored media or other comparison standard can be standardized or calibrated locally, and larger test installations, large maintenance shops, at the filter manufacturing location or any other test facility capable of measuring the efficiency and $\Delta P$ of a filter at the end of its useful life. Most urban environments will yield a dark gray or black dust cake. Such environments provide very similar dark gray or black indications of the end useful life. The dark gray or black comparison can periodically the check and maintained at any manufacturing facility for the filter structure, had test labs in specific urban centers, at large maintenance facilities or at any test location capable of measuring efficiency and $\Delta P$. In this way the color standards for gasoline engines, diesel engines, fuel cell power plants, hybrid vehicles (small gasoline engine/electric vehicle) can be confirmed or updated periodically. Similarly, locations having white, tan or other light colored dust cake, can measure, monitor, confirm and readjust color standards for the filter structures in those locations. In any event, measuring efficiency and pressure drop across the filter are straightforward measurements easily performed by one ordinary skill in the art of making and using motor vehicle filters. Using those measurements to standardize or calibrated black and white, gray scale or color scale comparator materials for the purpose of establishing filter life can easily the accomplished by following the directions in this specification. The black and white, gray scale, or color scale comparator materials I simply maintained or updated using efficiency and pressure drop measurements of filters and the end of the useful life.

In general, specifications for the performance of an air cleaner system are, generated by the preferences of the original equipment manufacturer (OEM) for the engine involved and/or the OEM of the truck or other equipment involved. While a wide variety of specifications may be involved, some of the major ones are the following:

1. Engine air intake need (rated flow)
2. Initial Restriction
3. Initial efficiency
4. Average or overall operating restriction
5. Overall efficiency
6. Filter service life The engine air intake need is a function of the engine size, i.e., displacement and rpm at maximum, full or "rated" load. In general, it is the product of displacement and rated rpm, modified by the volumetric efficiency, a factor which reflects turbo efficiency, duct efficiency, etc. In general, it is a measurement of the volume of air, per unit time, required by the engine or other system involved, during rated operation or full load. While air intake need will vary depending upon rpm, the air intake requirement is defined at a rated rpm, often at 1800 rpm or 2100 rpm for many typical truck engines, or 3000 to 6000 rpm for light vehicles. Herein this will be characterized as the "rated air flow" or by similar terms. The filter can be expose to air flows as low as 1 to 3 cfm (about 1 cfm per HP) from small engine air intake applications with engine power of about 2 to 8 HP. Larger engines consume an intake air flow of 50 to $10^3$ cfm, often 100 to 800 cfm. In general the filter must be rated to permit flow at least at the rated amount or higher without failure. In other applications In general, principles characterized herein can be applied to air cleaner arrangements used with systems specified for operation over a wide range of ratings or demands, including, for example, ones in the range of about 50 cubic feet/min. (cfm) up to 10 cfm. Such equipment includes, for example: automotive engines, pickup trucks and sport utility vehicle engines, engines for small trucks and delivery vehicles, buses, over-the-highway trucks, agricultural equipment (for example tractors), construction equipment, mining equipment, marine engines, a variety of generator engines, and, in some instances, gas turbines and air compressors. Fuel cell power plants are typically rated in kilowatts rather than horsepower, typically consuming about 5 cfm of air per kilowatt of power output. For fuel cell used in vehicles or stationary power generation applications rated air flow would typically be 5 to $10^3$ cfm, for some larger vehicles it may be as high as $10^5$ cfm.

Initial efficiency is the measurable efficiency of the filter when it is first put on line. As explained in U.S. Pat. No. 5,423,892 at Column 27, lines 1–40, especially with conventional pleated paper (barrier type or surface-loading) filters, initial efficiency is generally substantially lower than the overall average efficiency during use. This is because the "dust cake" or contaminant build-up on the surface of such a filter during operation, increases the efficiency of the filter. Initial efficiency is also often specified by the engine manufacturer and/or the vehicle manufacturer. With typical vehicle engines having air flow demands of 300 cfm or above, specifications of 98% or above (typically 98.5% or above) are common.

Restriction is the pressure differential across an air cleaner or air cleaner system during operation. Contributors to the restriction include: the filter media through which the air is directed; duct size through which the air is directed; and, structural features against which or around which the air is directed as it flows through the air cleaner and into the engine. With respect to air cleaners, initial restriction limits are often part of the specifications and demands of the engine manufacturer and/or equipment manufacturer. This initial restriction would be the pressure differential measured across the air cleaner when the system is put on line with a clean air filter therein and before significant loading occurs. Typically, the specifications for any given system have a maximum initial restriction requirement.

In general, engine and equipment manufacturers design equipment with specifications for air cleaner efficiency up to a maximum restriction. As reported in U.S. Pat. No. 5,423,892, at Column 2, lines 19–29 and, column 6, line 47, column 7, line 3, the limiting restriction: for typical truck engines is a pressure drop of about 20–30 inches of water, often about 25 inches of water; for automotive internal combustion engines is about 20–25 inches of water; for gas turbines, is typically about 5 inches of water; and, for industrial ventilation systems, is typically about 3 inches of water.

In general, some of the principal variables of concern in air cleaner design in order to develop systems to meet the types of specifications characterized in the previous section, are the following:

1. filter media type, geometry and efficiency;
2. air cleaner shape and structure; and
3. filter element size.

For example, conventional cellulose fiber media or similar media is generally a "barrier" filter. An example is paper media. In general, the operation of such media is through surface loading, i.e., when air is directed through the media, the surface of the media acts as a barrier or sieve, preventing passage of particulate material therethrough. In time, a dust cake builds on the surface of the media, increasing media efficiency. In general, the "tightness" or "porosity" of the fiber construction determines the efficiency, especially the initial efficiency, of the system. In time, the filter cake will effect (increase) the efficiency.

In general, such media is often defined or specified by its permeability. The permeability test for media is generally characterized in U.S. Pat. No. 5,672,399 at Col. 19, lines 27–39. In general, it is the media face velocity (air) required to induce a 0.50 inch water restriction across a flat sheet of the referenced material, media or composite. Permeability, as used herein, is assessed by a Frazier Perm Test, according to ASTM D737 incorporated herein by reference, for example using a Frazier Perm Tester available from Frazier Precision Instrument Co., Inc., Gaithersburg, Md., or by some analogous test.

The permeability of cellulose fiber media used in many types of engine filters for trucks having rated air flows fibers of 500 cfm or more manufactured by Donaldson Company, is media having a permeability of less than about 15 fpm, typically around 13 fpm. In general, in the engine filtration market, for such equipment, a variety of barrier media (pleated media) having permeability values of less than about 25 fpm, and typically somewhere within the range of 10–25 fpm, have been widely utilized by various element manufacturers.

The permeability of cellulose fiber media used in many types of engine filters for cars or other light vehicles having rated air flows fibers of 100 cfm or more manufactured by Donaldson Company, is media having a permeability of less than about 75 fpm, typically 20 to 50 fpm. In general, in the light vehicle engine filtration market, a variety of barrier media (pleated media) having permeability values of less than about 75 fpm, and typically somewhere within the range of 10–75 fpm, have been widely utilized by various element manufacturers.

With respect to media geometry, in general, with barrier filters, preferred geometries are typically pleated, cylindrical, patterns. Such cylindrical patterns are generally preferred because they are relatively straightforward to manufacture, use conventional filter manufacturing techniques, and are relatively easy to service. The pleating of surface loading media increases the surface area positioned within a given volume. Generally, major parameters with respect to such media positioning are: pleat depth; pleat density, typically measured as a number of pleats per inch along the inner diameter of the pleated media cylinder; and, cylindrical length or pleat length. In general, a principal factor with respect to selecting media pleat depth, pleat length, and pleat density, especially for barrier arrangements is the total surface area required for any given application or situation.

With respect to efficiency, principles vary with respect to the type of media involved. For example, cellulose fiber or similar barrier media is generally varied, with respect to efficiency, by varying overall general porosity or permeability. As explained in U.S. Pat. Nos. 5,423,892 and 5,672,399, the efficiency of barrier media can be modified in some instances by oiling the media and in others by applying, to a surface of the media, a deposit of relatively fine fibers, typically less than 5 microns and in many instances submicron sized (average) fibers. With respect to fibrous depth media constructions, for example, dry laid fibrous media, as explained in U.S. Pat. No. 5,423,892, variables concerning efficiency include: percent solidity of the media, and how compressed the media is within the construction involved; overall thickness or depth; and, fiber size.

With many engine air cleaner arrangements currently in the market, at least one of two general types of sealing arrangements between the element and the housing are used. One of these is a radially sealing arrangement. A variety of configurations of radially sealing arrangements are known, including: (1) the form available under the Donaldson trademark RadialSeal® from Donaldson Company of Minneapolis, Minn., and generally as described and characterized in European Patent 0329659B1, incorporated herein by reference; (2) the type described by Mann and Hummel in German Patent 4,241,586, and the corresponding (English language) published South African document 93/09129 published May 8, 1994, incorporated herein by reference; and, (3) the type characterized by Fleetguard in U.S. Pat. No. 5,556,440 at column 10, lines 53–67 and FIG. 26, incorporated herein by reference. In general, with radially sealing arrangements, a seal is formed as a result of forces directed radially around a tube to which the element is sealed.

Another common type of sealing arrangement is generally referred to as "axial". Axial systems are shown, for example, in U.S. Pat. Nos. 3,078,650; 3,488,928; 4,20,783; 4,647,373; and 5,562,746 each of which is incorporated herein by reference. In general, sealing forces for such arrangements are directed along the longitudinal axis of the cylindrical air filter element that result from compression of a gasket between an end surface of the air filter and a surface of a housing in which the air filter is positioned, with the seal oriented circumferentially around (or circumscribing) an air flow aperture or tube.

In FIG. 6, a schematic view of a system is shown generally at 620. System 20 is one example type of system in which air cleaner arrangements and constructions described herein is usable. In FIG. 6, equipment 621, such as a vehicle, having an engine 622 with some defined rated air flow demand is shown schematically. Equipment 621 may comprise a bus, an over the highway truck, an off-road vehicle, a tractor, or marine application such as a power boat. Engine 622 powers equipment 621, through use of an air, fuel mixture. In FIG. 6, air flow is shown drawn into engine 622 at an intake region 623. An optional turbo 624 is shown in phantom, as optionally boosting the air intake into the engine 622. An air cleaner 625 having a media pack 626 is upstream of the engine 622 and turbo 624. In general, in operation, air is drawn in at arrow 627 into the air cleaner 625 and through media pack 626. There, particles and contaminants are removed from the air. The cleaned air flows downstream at arrow 628 into the intake 623. From there, the air flows into engine 622, to power equipment 621.

In engine systems, during operation of the engine and depending on conditions of power setting, load, external ambient temperature and other variables, the temperature, under the hood, typically is at least 80° F. to 120° F., and often is in the range of 140° F. to 220° F. While under normal operations the filter is often near ambient temperatures, during periods of low air flow or other non-standard operations the temperature can reach 220° F. or more. Such temperatures can adversely affect the operating efficiency of the filter element. Regulations on emissions can increase the restriction on the engine exhaust, causing further increased temperatures. Constructing the filter media in the form of a composite of a high permeability, low efficiency barrier media and at least a single layer, and in some instances, multiple layers of "fine fiber" can improve the performance (the operating efficiency, in particular) of the filter element over prior art filter elements that are not constructed from such media composites and provide visual lifetime inspection parameters.

A first embodiment of a filter element is shown in FIGS. 7 and 8. In this embodiment, the filter element 100 takes the form of a panel filter 102. The panel filter element 102 includes a media pack 104 in the form of a pleated construction 106. As can be seen from review of FIGS. 7 and 8, the pleated construction 106 forms generally a flat panel 107 with a plurality of pleats 108.

The panel filter construction 102 has an outer perimeter gasket member 110 in order to form a seal with a cooperating housing.

The media pack 104 includes a media construction that is specially formulated for operation in high temperature conditions, such as in engine system 620. The panel filter element 102 with the specially formulated media pack 104 is also usable in systems such as fluid compressors.

In reference now to FIGS. 9–11, an embodiment of an air cleaner 130 (FIG. 10) including a primary filter element 132 and a safety element 134 is depicted. The air cleaner 130, in the particular embodiment depicted in FIGS. 9–11, is the type of air cleaner constructed for sealing by way of a radially directed seal.

Turning first to the primary element 132, FIG. 9 illustrates the primary element 132 in side, elevational view. The primary element 132 depicted includes first and second opposite end caps 136, 138; an outer support tube or liner 140; and a media pack 142 for filtering the air. The media pack 142 has first and second opposite ends 143, 144. At the first end 143 of the media pack 142, the first end cap 136 is secured to the media pack 142; analogously, the second end 144 of the media pack 142 is secured to the second end cap 138. In typical arrangements, the first and second end caps 136, 138 are molded from a compressible material, such as polyurethane foam. In such arrangements, the media pack 142 is bonded to the first and second end caps 136, 138 by potting the media in the polyurethane foam, before the polyurethane material has cured.

In preferred arrangements, the media pack 142 comprises a pleated construction 146. By "pleated construction," it is meant that the media pack 142 has a series or plurality of folds or pleats, usually uniformly distributed about the media pack 142.

In reference now to FIG. 10, it can be seen that the pleated construction 146 is preferably in the form of a tube, preferably cylindrical, defining an open filter interior 148. The primary filter element 132 forms a seal 150 with an air cleaner outlet tube 152 to inhibit the passage of air from bypassing the media pack 142 and flowing directly out through the outlet tube.

General principles of operation of the primary filter element 132 may now be appreciated. In general, air to be filtered flows through the media pack 142 from an external environment and into the open interior 148. The media pack 148 operates to remove particulate matter from the air stream. From there, the air flows through the safety element 134 and into an open interior 154 of the safety element. The cleaned air then exits the air cleaner 130 through the flow conduit 156 formed by the outlet tube 152. The seal 150 between the primary filter element 132 and the outlet tube 152 prevents unfiltered air from bypassing the media pack 142 and flowing directly through the flow conduit 156. A seal 158 between the safety element 134 and the outlet tube 152 prevents air from bypassing the safety element 134.

In reference now to FIG. 11, one example shape for the first end cap 136 is utilized in order to obtain the seal 150. In particular, the end cap 136 includes an axial portion 160 and a radial portion 162. The radial portion 162 circumscribes an end cap opening 164, which is in air flow communication with the open filter interior 148. The radial portion 162 also acts as a sealing portion 166. The sealing portion 166 is made from a compressible material, such that it can be squeezed to deflect toward the media pack 142 with hand pressure (less than 75 lbs.). The sealing portion 166 preferably is in the form of a stepped construction 168, which increases in thickness from the axial portion 160 of the end cap toward the interior 148. In the particular embodiment illustrated, the stepped construction 168 includes at least three steps 169, 170, 171 of decreasing cross-sectional thickness. This stepped construction 168 helps to allow the primary element 132 to more easily fit over the outlet tube 152 when mounting the primary element 132 onto the outlet tube 152. Once seated properly, the sealing portion 166 forms the seal 150 with the outlet tube 152, and in particular, a radial seal 172. The radial seal 172 is formed by compression of the sealing portion 166 between and against the outlet tube 152 and an inner support tube or liner 174. The inner support liner 174 extends between the first and second end caps 136, 138 and is usually potted within them and bonded thereto. The inner support tube 174 is usually constructed analogously as the outer liner 140. As such, it is porous and air permeable, and can be constructed from expanded metal.

The radial seal 162 is described in detail in U.S. Pat. No. 4,720,292 B2, incorporated herein by reference.

The second end cap 138 is a closed end cap, in the embodiment depicted in FIGS. 9 and 10. By the term "closed," it is meant that the second end cap 138 is solid throughout and defines no apertures allowing for the flow of fluid therethrough.

The sealing portion 166, and preferably the entire first end cap 136, is formed by a compressible material, preferably polyurethane, more preferably polyurethane foam. In one usable embodiment, the material comprises polyurethane foam having an as-molded density of 14–22 lbs. per cubic inch. For a properly functioning radial seal 172, the sealing portion 166 needs to be substantially compressed when the primary element 132 is mounted on the outlet tube 152. In many preferred constructions, it is compressed between about 15% and 40% (often about 20–33%) of its thickness, in the thickest portion 169, to provide for a strong robust seal yet still be one that can result from hand installation of the element 132 with forces on the order of 80 lbs. or less, preferably 75 lbs. or less, and generally 50–70 lbs. A usable material for the sealing portion 166 is described in U.S. Pat. No. 5,613,992, incorporated herein by reference.

The description, figures and explanation above-provides an enabling basis to understand the technical operation of aspects of the invention, however, many embodiments of the invention can be made without departing from the spirit and content of the invention. The invention resides in the claims hereinafter appended.

What is claimed is:

1. An air filter element for a motor vehicle having an air intake or induction system, the air filter element comprising sufficient capacity for filtering about 1 to about $10^5$ cfm of air in an engine having an output of about 2 to about 500 horsepower; the air filter element further comprising a white filter media held within a cartridge, the white filter media, the media having an initial efficiency, under ASTM-1215-89 with mono-disperse 0.78 micron polystyrene latex particles at 20 ft/min velocity, of at least 20%, that rises to greater than 95% during its useful service life, the media comprising:
   (a) a filtration layer comprising a white layer of fine fiber comprising a web of fiber the fiber having a diameter of about 0.05 to about 1 microns, a basis weight of about $5 \cdot 10^{-6}$ to $6 \cdot 10^{-5}$ grams per square centimeter; and
   (b) the web of fine fiber formed on a filtration layer comprising a layer of a white filter media having an efficiency of at least 15% and a permeability of less than about 200 fpm;
wherein the layer of fine fiber surface loads and accumulates a layer of particulate, the substrate accumulates substantially no particulate and the appearance of the accumulated layer compared to the white filter media indicates the useful service life of the filter media pack.

2. The element of claim 1 wherein the element comprises a flat-panel element including a pleated media.

3. The element of claim 1 wherein the element comprises a cylindrical element including a pleated media.

4. The element of claim 1 wherein the element has an initial efficiency, under ASTM-1215-89 with mono-disperse 0.78 micron polystyrene latex particles at 20 ft/min velocity, of at least 30%, that rises to greater than 99%.

5. The element of claim 1 wherein the substrate has permeability greater than about 10 fpm.

6. The element of claim 1 wherein the white layer of fine fiber has a layer efficiency, under ASTM-1215-89 with mono-disperse 0.78 micron polystyrene latex particles at 20 ft/min velocity, of at least 40%, that rises to greater than 99%.

7. The element of claim 1 wherein the white layer of fine fiber has a fiber diameter of about 0.1 to 0.4 microns and a basis weight of about $5 \cdot 10^{-6}$ to $6 \cdot 10^{-5}$ grams per square centimeter.

8. The element of claim 1 wherein the substrate has efficiency less than about 40%, under ASTM-1215-89 with mono-disperse 0.78 micron polystyrene latex particles at 20 ft/min velocity.

9. The element of claim 1 wherein the white layer of fine fiber has an average pore size of about 2 to 20 microns.

10. A method of maintaining a motor vehicle using an air filter element replacement; the method comprising a maintenance process involving a motor vehicle having an air induction, the method comprising:
   (i) visually inspecting an air filter element installed in the induction system of the automobile, the air filter element comprises sufficient capacity for filtering about 1 to about $10^5$ cfm of air in an engine having an output of about 2 to about 500 horsepower; to air filter element further comprising a white filter media held within a cartridge, the white filter media, the media having an initial efficiency, under ASTM-1215-89 with mono-disperse 0.78 micron polystyrene latex particles at 20 ft/min velocity, of at least 20%, that rises to greater than 95% during its useful service life, the media comprising:
      (a) a filtration layer comprising a white layer of fine fiber comprising a web of fiber the fiber having a diameter of about 0.05 to about 1 micron, a basis weight of about $5 \cdot 10^{-6}$ to $6 \cdot 10^{-5}$ grams per square centimeter; and
      (b) the web of fine fiber formed on a filtration layer comprising a layer of a white filter media having an efficiency of at least 15% and a permeability of less than about 200 fpm;
   wherein the layer of fine fiber surface loads and accumulates a layer of particulate, the substrate accumulates substantially no particulate and the appearance of the accumulated layer compared to the white filter media indicates the useful service life of the filter media pack; and
   (ii) replacing the filter element.

11. The element of claim 10 wherein the element comprises a flat-panel element including a pleated media.

12. The element of claim 10 wherein the element comprises a cylindrical element including a pleated media.

13. The element of claim 10 wherein the element has an initial efficiency, under ASTM-1215-89 with mono-disperse 0.78 micron polystyrene latex particles at 20 ft/min velocity, of at least 30%, that rises to greater than 99%.

14. The element of claim 10 wherein the substrate has permeability greater tan about 10 fpm.

15. The element of claim 10 wherein the white layer of fine fiber has a layer efficiency, under ASTM-1215-89 with mono-disperse 0.78 micron polystyrene latex particles at 20 ft/min velocity, of at least 40%, that rises to greater than 99%.

16. The element of claim 10 wherein the white layer of fine fiber has a fiber diameter of about 0.1 to 0.4 microns and a basis weight of about $5 \cdot 10^{-6}$ to $6 \cdot 10^{-5}$ grams per square centimeter.

17. The element of claim 10 wherein the substrate has efficiency less than about 40%, wider ASTM-1215-89 with mono-disperse 0.78 micron polystyrene latex particles at 20 ft/min velocity.

18. The element of claim 10 wherein the white layer of fine fiber has an average pore size of about 2 to 20 microns.

19. The method of claim 10 wherein the motor vehicle comprises a fuel cell typically consuming about 5 cfm of air per kilowatt of power output.

20. A method of operating a motor vehicle maintenance business, including replacement of consumables, the method comprises:
(i) periodically inspecting a motor vehicle on a routine return schedule, including an inspection of the air induction filter element the air filter element comprising sufficient capacity for filtering about 1 to about $10^5$ cfm of air in an engine having an output of about 2 to about 500 horsepower; the air filter element further comprising a white filter media held within a cartridge, the white filter media, the media having an initial efficiency, under ASTM-1215-89 with monodisperse 0.78 micron polystyrene latex particles at 20 ft/min velocity, of at least 20%, that rises to greater than 95% during its useful service life, the media comprising:
  (a) a filtration layer comprising a white layer of fine fiber comprising a web of fiber the fiber having a diameter of about 0.05 to about 0.5 microns a basis weight of about $5 \cdot 10^{-6}$ to $6 \cdot 10^{-5}$ grams per square centimeter; and
  (b) the web of fine fiber formed on a filtration layer comprising a layer of a white filter media having an efficiency of at least 15% and a permeability of less than about 200 fpm;
wherein the layer of fine fiber surface loads and accumulates a layer of particulate, the substrate accumulates substantially no particulate and the appearance of the accumulated layer compared to the white filter media indicates the useful service life of the filter media pack;
(ii) obtaining a comparison the depth of color or intensity of gray scale to a standard; and
(iii) replacing the element if the comparison establishes the end of the useful life of the filter.

21. The element of claim 20 wherein the element comprises a flat-panel element including a pleated media.

22. The element of claim 20 wherein the element comprises a cylindrical element including a pleated media.

23. The element of claim 20 wherein the element has an initial efficiency, under ASTM-1215-89 with mono-disperse 0.78 micron polystyrene latex particles at 20 ft/min velocity, of at least 30%, that rises to greater than 99%.

24. The element of claim 20 wherein the substrate has permeability greater than about 10 fpm.

25. The element of claim 20 wherein the white layer of fine fiber has a layer efficiency, under ASTM-1215-89 with mono-disperse 0.78 micron polystyrene latex particles at 20 ft/min velocity, of at least 40%, that rises to greater than 99%.

26. The element of claim 20 wherein the white layer of fine fiber has a fiber diameter of about 0.1 to 0.4 microns and a basis weight of about $5 \cdot 10^{-6}$ to $6 \cdot 10^{-5}$ grams per square centimeter.

27. The element of claim 20 wherein the substrate has efficiency less than about 40%, under ASTM-1215-89 with mono-disperse 0.78 micron polystyrene latex particles at 20 ft/min velocity.

28. The element of claim 20 wherein the white layer of fine fiber has an average pore size of about 2 to 20 microns.

29. The method of claim 20 wherein the motor vehicle comprises a fuel cell typically consuming about 5 cfm of air per kilowatt of power output.

30. An air filter element for a motor vehicle having an air intake or induction system, the air filter element comprising sufficient capacity for filtering about 1 to about $10^5$ cfm of air in an engine having an output of about 2 to about 500 horsepower; the air filter element further comprising a filter media, comprising a dark hue or color that can provide a contrast to a light particulate, held within a cartridge, the filter media having an initial efficiency, under ASTM-1215-89 with mono-disperse 0.78 micron polystyrene latex particles at 20 ft/min velocity, of at least 20%, that rises to greater than 95% during its useful service life, the media comprising:
  (a) a filtration layer comprising a layer of fine fiber, comprising a dark hue or color that can provide a contrast to a light particulate, the layer comprising a web of fiber the fiber having a diameter of about 0.05 to about 1 microns, a basis weight of about $5 \cdot 10^{-6}$ to $6 \cdot 10^{-5}$ grams per square centimeter; and
  (b) the layer of fine fiber formed on a filtration layer comprising a layer of filter media, comprising a dark hue or color that can provide a contrast to a light particulate, the filter media having an efficiency of at least 15% and a permeability of less than about 200 fpm;
wherein the layer of fine fiber surface loads and accumulate a layer of particulate, the substrate accumulates substantially no particulate and the appearance of the accumulated layer compared to the filter media indicates the useful service life of the filter media pack.

31. The element of claim 30 wherein the element comprises a flat-panel element including a pleated media.

32. The element of claim 30 wherein the element comprises a cylindrical element including a pleated media.

33. The element of claim 30 wherein the element has an initial efficiency, under ASTM-1215-89 with mono-disperse 0.78 micron polystyrene latex particles at 20 ft/min velocity, of at least 30%, that rises to greater than 99%.

34. The element of claim 30 wherein the substrate has permeability greater than about 10 fpm.

35. The element of claim 30 wherein the layer of fine fiber has a layer efficiency, under ASTM-1215-89 with mono-disperse 0.78 micron polystyrene latex particles at 20 ft/min velocity, of at least 40%, that rises to greater than 99%.

36. The element of claim 30 wherein the layer of fine fiber has a fiber diameter of about 0.1 to 0.4 microns mm and a basis weight of about $5 \cdot 10^{-6}$ to $6 \cdot 10^{-5}$ grams per square centimeter.

37. The element of claim 30 wherein the substrate has efficiency less than about 40% under ASTM-1215-89 with mono-disperse 0.78 micron polystyrene latex particles at 20 ft/min velocity.

38. The element of claim 30 wherein the layer of fine fiber has an average pore size of about 2 to 20 micron.

39. The method of claim 30 wherein the motor vehicle comprises a fuel cell typically consuming about 5 cfm of air per kilowatt of power output.

40. A method of maintaining a motor vehicle using an air filter element replacement; the method comprising a maintenance process involving a motor vehicle having an air induction, the method comprising:
(i) visually inspecting an air filter element installed in the induction system of the automobile, the air filter element comprising sufficient capacity for filtering about 1 to about $10^5$ cfm of air in an engine having an output of about 2 to about 500 horsepower; the air filter element further comprising a filter media held within a cartridge, the filter media, comprising a dark hue or color that can provide a contrast to a light particulate, the media having an initial efficiency, under ASTM-1215-89 with mono-disperse 0.78 micron polystyrene latex particles at 20 ft/min velocity, of at least 20%, that rises to greater than 95% during its useful service life, the media comprising:

(a) a filtration layer comprising a layer of fine fiber, comprising a dark hue or color that can provide a contrast to a light particulate, the layer comprising a web of fiber the fiber having a diameter of about 0.05 to about 1 micron, a basis weight of about $5 \cdot 10^{-6}$ to $6 \cdot 10^{-5}$ grams per square centimeter on the substrate; and (b) the layer of fine fiber formed on a filtration layer comprising a layer of filter media comprising a dark hue or color that can provide a contrast to a light particulate, the substrate having an efficiency of at least 15% and a permeability of less than about 200 fpm;

wherein the layer of fine fiber surface loads and accumulates a layer of particulate, the substrate accumulates substantially no particulate and the appearance of the accumulated layer compared to the filter media indicates the useful service life of the filter media pack; and (ii) replacing the filter element.

41. The element of claim 40 wherein the element comprises a flat-panel element including a pleated media.

42. The element of claim 40 wherein the element comprises a cylindrical element including a pleated media.

43. The element of claim 40 wherein the element has an initial efficiency, under ASTM-1215-89 with mono-disperse 0.78 micron polystyrene latex particles at 20 ft/min velocity, of at least 30%, that rises to greater than 99%.

44. The element of claim 40 wherein the substrate has permeability greater than about 10 fpm.

45. The element of claim 40 wherein the layer of fine fiber has a layer efficiency, under ASTM-1215-89 with mono-disperse 0.78 micron polystyrene latex particles at 20 ft/min velocity, of at least 40%, that rises to greater than 99%.

46. The element of claim 40 wherein the layer of fine fiber has a fiber diameter of about 0.1 to 0.4 microns and a basis weight of about $5 \cdot 10^{-6}$ to $6 \cdot 10^{-5}$ grams per square centimeter.

47. The element of claim 40 wherein the substrate has efficiency less than about 40%, under ASTM-1215-89 with mono-disperse 0.78 micron polystyrene latex particles at 20 ft/min velocity.

48. The element of claim 40 wherein the layer of fine fiber has an average pore size of about 2 to 20 microns.

49. The method of claim 40 wherein the motor vehicle comprises a fuel cell typically consuming about 5 cfm of air per kilowatt of power output.

50. A method of operating a motor vehicle maintenance business, including replacement of consumables, the method comprises:

(i) periodically inspecting a motor vehicle on a routine return schedule, including an inspection of the air induction filter element the air filter element comprising sufficient capacity for filtering about 1 to about $10^5$ cfm of air in an engine having an output of about 2 to about 500 horsepower; the air filter element further comprising a filter media held within a cartridge, the filter media comprising a dark hue or color that can provide a contrast to a light particulate, the media having an initial efficiency, under ASTM-1215-89 with monodisperse 0.78 micron polystyrene latex particles at 20 ft/min velocity, of at least 20%, that rises to greater than 95% during its useful service life, the media comprising:

(a) a filtration layer comprising a layer of fine fiber, comprising a dark hue or color that can provide a contrast to a light particulate, comprising a web of fiber the fiber having a diameter of about 0.05 to about 0.5 microns a basis weight of about $5 \cdot 10^{-6}$ to $6 \cdot 10^{-5}$ grams per square centimeter; and (b) the web of fine fiber formed on a filtration layer comprising a layer of a white filter media having an efficiency of at least 15% and a permeability of less than about 200 fpm;

wherein the layer of fine fiber surface loads and accumulates a layer of particulate, the substrate accumulates substantially no particulate and the appearance of the accumulated layer compared to the fitter media indicates the useful service life of the filter media pack;

(ii) obtaining a comparison the contrast to a standard; and (iii) replacing the element if the comparison establishes the end of the useful life of the filter.

51. The element of claim 50 wherein the element comprises a flat-panel element including a pleated media.

52. The element of claim 50 wherein the element comprises a cylindrical element including a pleated media.

53. The element of claim 50 wherein the element has an initial efficiency, under ASTM-1215-89 with mono-disperse 0.78 micron polystyrene latex particles at 20 ft/min velocity, of at least 30%, that rises to greater than 99%.

54. The element of claim 50 wherein the substrate has permeability greater than about 10 fpm.

55. The element of claim 50 wherein the layer of fine fiber has a layer efficiency, under ASTM-1215-89 with mono-disperse 0.78 micron polystyrene later particles at 20 ft/min velocity, of at least 40%, that rises to greater than 99%.

56. The element of claim 50 wherein the layer of fine fiber has a fiber diameter of about 0.1 to 0.4 microns and a basis weight of about $5 \cdot 10^{-6}$ to $6 \cdot 10^{-5}$ grams per square centimeter.

57. The element of claim 50 wherein the substrate has efficiency less than about 40%, under ASTM-1215-89 with mono-disperse 0.78 micron polystyrene latex particles at 20 ft/mm velocity.

58. The element of claim 50 wherein the layer of fine fiber has an average pore size of about 2 to 20 microns.

59. The method of claim 50 wherein the motor vehicle comprises a fuel cell typically consuming about 5 cfm of air per kilowatt of power output.

* * * * *

UNITED STATES PATENT AND TRADEMARK OFFICE
CERTIFICATE OF CORRECTION

| | | |
|---|---|---|
| PATENT NO. | : 6,875,249 B2 | Page 1 of 7 |
| APPLICATION NO. | : 10/268068 | |
| DATED | : April 5, 2005 | |
| INVENTOR(S) | : Gogins | |

It is certified that error appears in the above-identified patent and that said Letters Patent is hereby corrected as shown below:

Sheet 2 of 10: Fig. 2 has lost resolution in the copying process. Below is a clearer resolution of Fig. 2:

FIG. 2

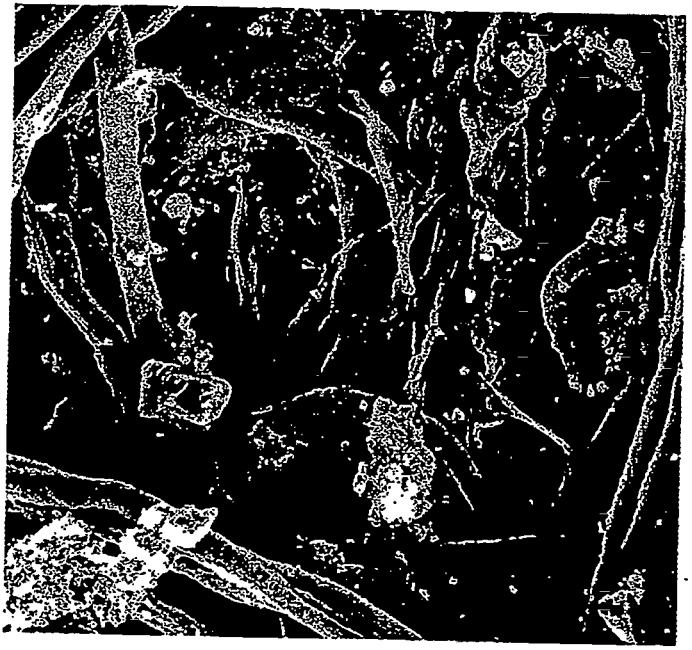

UNITED STATES PATENT AND TRADEMARK OFFICE
CERTIFICATE OF CORRECTION

| | | |
|---|---|---|
| PATENT NO. | : 6,875,249 B2 | Page 2 of 7 |
| APPLICATION NO. | : 10/268068 | |
| DATED | : April 5, 2005 | |
| INVENTOR(S) | : Gogins | |

It is certified that error appears in the above-identified patent and that said Letters Patent is hereby corrected as shown below:

Sheet 3 of 10: Fig. 3 has lost resolution in the copying process. Below is a clearer resolution of Fig. 3:

FIG. 3

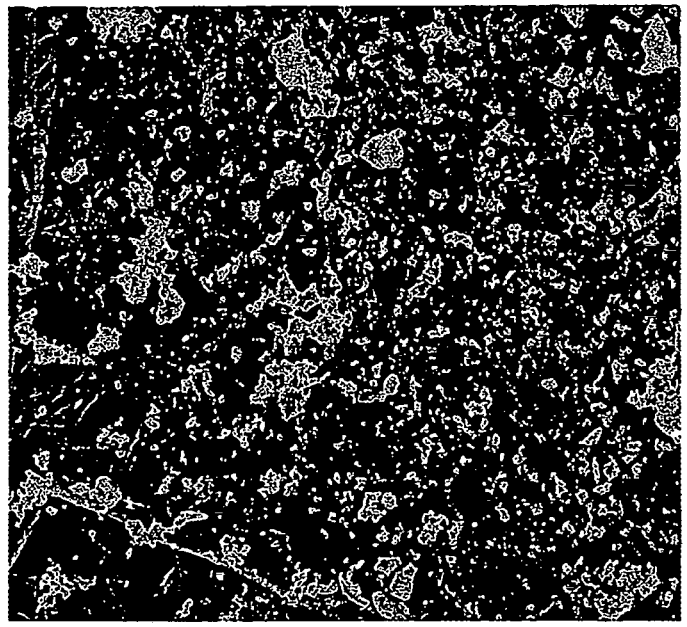

UNITED STATES PATENT AND TRADEMARK OFFICE
CERTIFICATE OF CORRECTION

| | | |
|---|---|---|
| PATENT NO. | : 6,875,249 B2 | |
| APPLICATION NO. | : 10/268068 | |
| DATED | : April 5, 2005 | |
| INVENTOR(S) | : Gogins | |

It is certified that error appears in the above-identified patent and that said Letters Patent is hereby corrected as shown below:

Sheet 4 of 10: Fig. 4 has lost resolution in the copying process. Below is a clearer resolution of Fig. 4:

FIG. 4

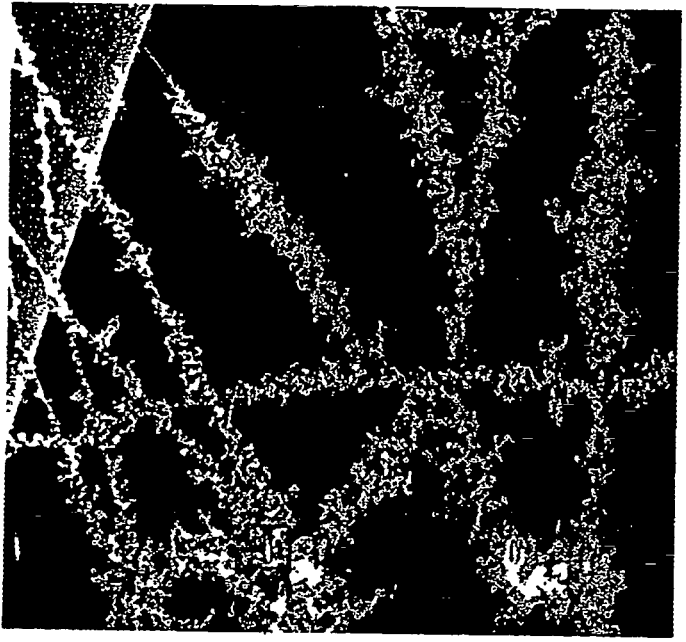

UNITED STATES PATENT AND TRADEMARK OFFICE
CERTIFICATE OF CORRECTION

PATENT NO.        : 6,875,249 B2                              Page 4 of 7
APPLICATION NO. : 10/268068
DATED             : April 5, 2005
INVENTOR(S)       : Gogins It is certified that error appears in the above-identified patent and that said Letters Patent is hereby corrected as shown below:

Col. 18, line 16, claim 10: "comprises sufficient" should read --comprising sufficient--

Col. 18, line 18, claim 10: "to air filter element" should read --the air filter element--

Col. 18, line 20, claim 10: "cartridge, the white filter media, the media" should read --cartridge, the media--

Col. 18, line 60, claim 17: "wider ASTM-1215-89" should read --under ASTM-1215-89--

Col. 20, line 19, claim 30: "and accumulate" should read --and accumulates--

Col. 20, line 39, claim 36: "0.4 microns mm and" should read --0.4 microns and--

Col. 20, line 47, claim 38: "2 to 20 micron." should read --2 to 20 microns.--

Col. 22, line 22, claim 50: "the fitter media" should read --the filter media--

Col. 22, line 39, claim 55: "later particles" should read --latex particles--

Col. 22, line 48, claim 57: "ft/mm velocity." should read --ft/min velocity.--

Signed and Sealed this

Seventh Day of November, 2006

JON W. DUDAS
*Director of the United States Patent and Trademark Office*